Sept. 20, 1960 R. GLAVAN 2,952,900
METHOD FOR MAKING PILLOW BLOCK SELF-ALIGNING BEARING
Filed Nov. 21, 1957 3 Sheets-Sheet 1
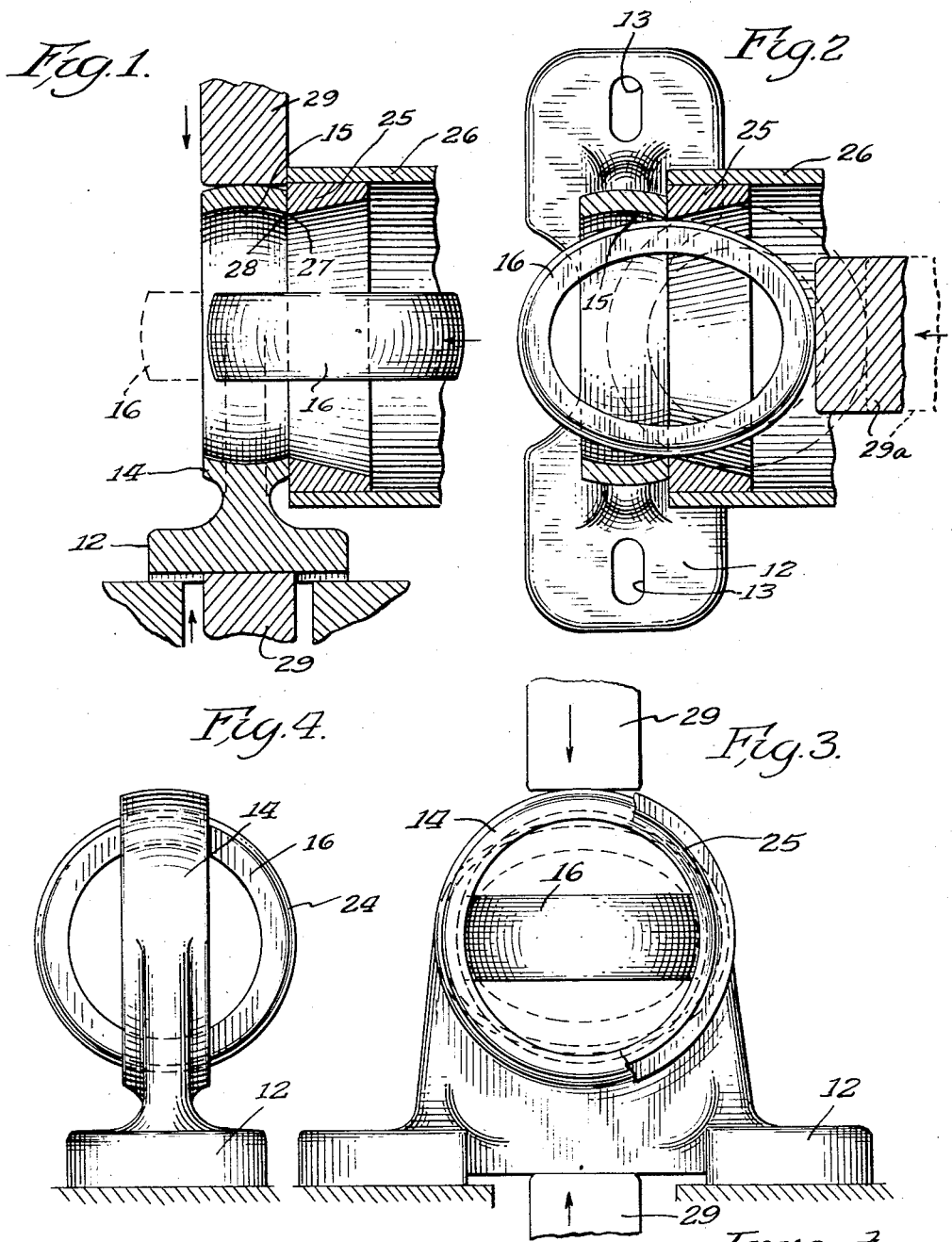
Inventor
Richard Glavan
By Mann, Brown & McWilliams
Attys.

Sept. 20, 1960      R. GLAVAN           2,952,900
METHOD FOR MAKING PILLOW BLOCK SELF-ALIGNING BEARING
Filed Nov. 21, 1957                3 Sheets-Sheet 2
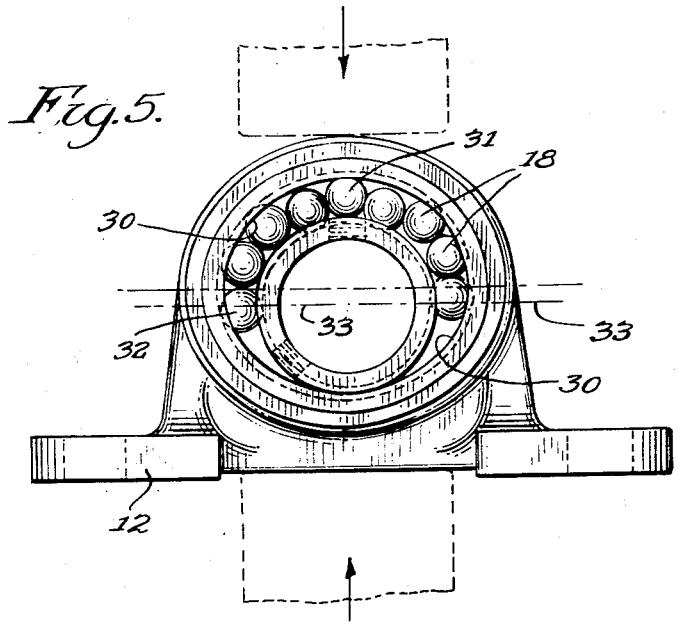
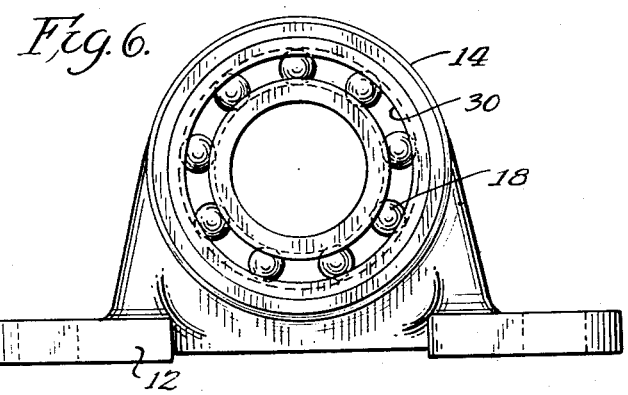
Inventor
Richard Glavan
By
Mann, Brown and McWilliams
Attys.

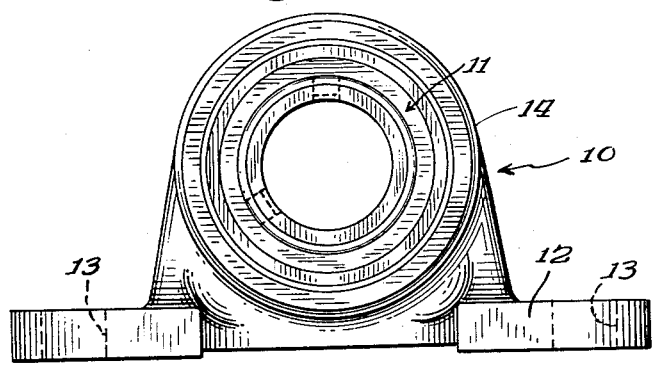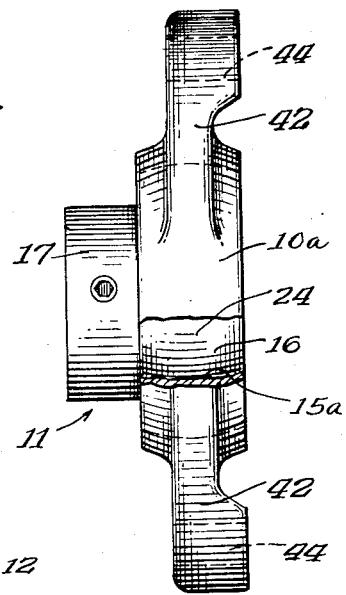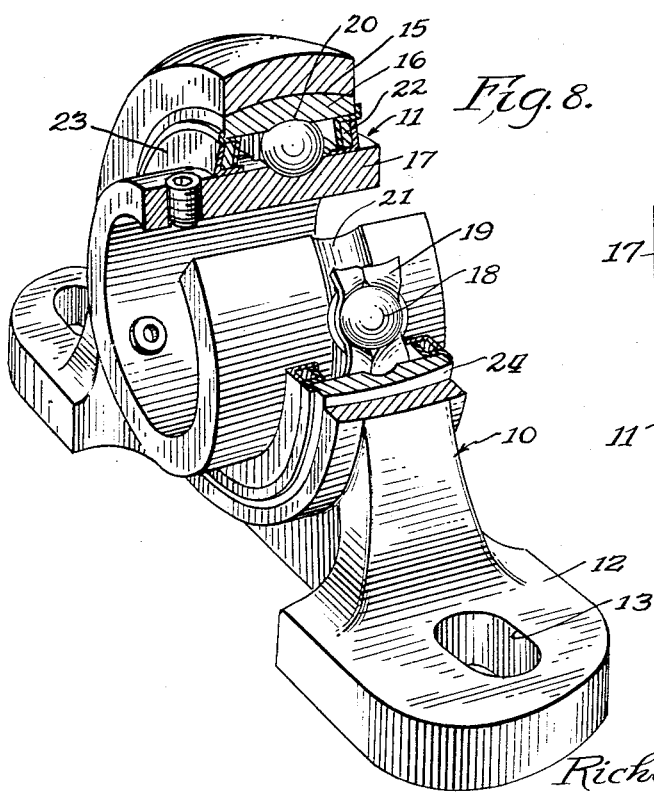

United States Patent Office

2,952,900
Patented Sept. 20, 1960

2,952,900
METHOD FOR MAKING PILLOW BLOCK SELF-ALIGNING BEARING

Richard Glavan, Joliet, Ill., assignor to Stephens-Adamson Mfg. Co., a corporation of Illinois Filed Nov. 21, 1957, Ser. No. 697,843

4 Claims. (Cl. 29—148.4)

This invention relates to an improved method for making a pillow block rolling bearing unit of the self-aligning type.

Pillow block bearing units, when of the self-aligning type, are either made in two parts, which are clamped together so that the bearing with its spherically shaped outer surface can be mounted within the correspondingly shaped inner surface of the housing, or the housing is provided with mounting slots which permit the bearing to be slipped into place edgewise and then rotated into its normal position.

There are certain inherent disadvantages in pillow block bearing units made in two parts or with mounting slots. In the former case, there is always a problem of some of the components of the bearing unit being lost or misplaced and of clamping pressures being two little or too great; and in the latter case the mounting slots tend to weaken the bearing unit, particularly against thrust loads.

The present invention provides a method for making pillow block rolling bearing units of the self-aligning type in which the pillow block may be of unitary construction, and yet not require the use of mounting slots. As a result, the bearing structure produced by my method has greater capacity for thrust loads, and since the spherical seat for the bearing assembly completely envelops the outer race of such assembly the mating spherically shaped surfaces of the pillow block housing and outer race of the bearing assembly are kept clean and free from dirt and other foreign material.

My process is further characterized by low cost and simple tooling.

Further and other objects and advantages of the invention will be apparent as the disclosure proceeds and the description is read in conjunction with the accompanying drawings, in which:

Fig. 1 shows one step of my process in which the outer race of the bearing is forced edgewise through a squeeze ring into the single piece pillow block;

Fig. 2 is a horizontal sectional view showing the same step;

Fig. 3 is a front elevational view showing the same step, but also illustrating how assembly of the outer race step of the bearing within the pillow block housing can be facilitated by appropriate distortion of the bearing housing;

Fig. 4 is an elevational view showing the outer race of the bearing after it has been snapped into place within the pillow block housing;

Fig. 5 is a diagrammatic view which shows how a maximum number of balls may be inserted into the bearing while it is being assembled subsequent to the mounting of the outer race in the pillow block housing;

Fig. 6 is a similar view but showing the inner race in its normal operative position with the balls appropriately spaced about the bearing;

Fig. 7 is a front elevational view showing the product produced by my method;

Fig. 8 is a perspective view, partly in section, showing the same; and

Fig. 9 is a plan view, with parts broken away, of a flange type bearing unit produced by my method.

Before describing my improved method, it will be convenient to describe briefly the bearing structure that is produced by the method, and reference is first made to Figs. 7 and 8, which show such structure.

The completed unit comprises a single-piece pillow block generally designated 10, within which is mounted a rolling bearing assembly generally designated 11.

The pillow block may be formed of any suitable metal and may be cast or forged. Normally the block would be made of cast iron. The bore of the pillow block blank as cast may be initially spherical or cylindrical in configuration, which bore is subsequently machined to provide the desired bearing seat.

The pillow block comprises a base 12 provided with apertures 13 for the reception of mounting screws or bolts, and rising from the base is a bearing housing 14, which is circular in form and is provided on its inner periphery with a concave, spherically shaped seat 15. The seat is machined to its spherical shape, and it should be noted that the housing 14 is continuous throughout its periphery and is of substantially uniform width, so that it completely encases the bearing assembly 11. This, of course, is not intended to exclude a lubricating opening or fitting, if such is desired, or other inconsequential discontinuities.

The bearing assembly 11 comprises an outer race 16, an inner race 17, both made of steel, and a plurality of balls 18, which are appropriately spaced about the bearing by retainer rings 19 and travel in deep grooves 20 and 21 which are formed in the opposed faces of the outer and inner races, respectively. The bearing is sealed at its sides by the usual sealing rings 22 and 23.

The outer race 16 is provided with a spherically shaped outer surface 24, which matches in shape the configuration of the spherical surface 15 on the inner face of the pillow block housing 14, so that the bearing assembly as a whole has universal movement with respect to its housing.

After the pillow block 10 has had the spherical seat 15 machined on its inner surface, it is placed in a fixture which includes a tapered squeeze ring 25 that is held against the pillow block by a sleeve 26. The smallest diameter of the squeeze ring is indicated at 27 and abuts the pillow block, as shown in Fig. 1. This diameter is made substantially equal to or slightly less than the diameter of the opening in the pillow block housing 14 at its outer faces, as indicated at 28, so that it is possible to take the outer race 16 of the bearing assembly 11, and before such assembly is made, force it (as by ram 29a) edgewise through the ring 25 into position within the seat 15. In passing through the squeeze ring 25, the outer race 16 assumes a somewhat elliptical form, as shown in Fig. 2, but the deformation of the race is not so great as to exceed its elastic limit, so that, when the greatest diameter of the deformed race passes the point 28 in the bearing housing, it then snaps into position within the housing, as shown in Fig. 4. The race may then be rotated about a transverse axis to bring it into operative position and ready for the reception of the remaining parts of the bearing assembly 11.

In order to aid or assist in the insertion of the outer race 16 within the housing 14 and to limit the deformation of the outer race required for its insertion, it is possible to apply a squeeze upon the bearing housing 14 in a plane normal to that used for compressing the race 16, this being accomplished, for example, by heads or vise members 29, to which inwardly directed forces are applied, as shown by the arrows. The application of these forces tends to deform the housing 14, and hence the bearing seat 15, to elliptical form, as shown in Fig. 3, but, again, this is kept within the elastic limit of the housing material so that when pressure is released it will spring back to its normal circular shape.

In instances where a squeeze pressure of this type is to be exerted on the bearing housing 14 to aid in the insertion of the outer race, or to aid in the assembly of the remaining bearing structure, as hereinafter described, the pillow block is preferably made of a more ductile material than the usual cast iron in order to avoid breakage.

It will be understood that the showings of the elliptical forms in Figs. 2 and 3 are somewhat exaggerated in order to better illustrate the principles involved.

After the race 16 has been mounted in its seat 15 within the housing 14, it is placed on its side on a horizontal surface, and the inner race 17 mounted therewithin against the bottom of the outer race, as shown in Fig. 5. This forms a crescent shaped space 30, which permits the balls 18 to be slipped into place within such space; but, in order to use a maximum number of balls in the assembly for obtaining high load capacity, pressure is again exerted upon the top and bottom of the pillow block, as indicated in Fig. 5, to distort the bearing seat 15, and the encased outer race 16, into somewhat elliptical form, whereupon an additional ball, say, the ball 31, may be forced downwardly into place, which in turn forces an end ball, as, for example, the ball 32, slightly below the center line 33 of the inner race, whereupon when the pressure is released on the pillow block the inner race is brought to its central position and the balls appropriately spaced around the bearing, as shown in Fig. 6. After this, the retaining rings 19 are secured in place, as are also the sealing rings 22 and 23.

It will be understood that when the pillow block 10 does not have to be distorted to elliptical shape, either for the mounting of the outer race therewithin or for the insertion of a maximum number of balls for obtaining desired load capacity, the pillow block may be made of ordinary cast iron, but in the other practices of my invention a more ductile and less brittle material is required. Examples of such materials are ductile cast iron, nodular iron, malleable cast iron, perlitic malleable iron, Meehanite, bronze, and aluminum-bronze.

It will be obvious that my method is applicable to other types of bearing units that include housings formed from materials such as those above specified, as illustrated by Figure 9 which shows a flange type bearing unit 40 produced by my method. Unit 40 includes bearing assembly 11 mounted in seat 15a of flange housing 10a that is formed from materials of the type specified above. Housing 10a includes flanges 42 appropriately formed with bolt or screw holes 44. Surface 15a is formed and the outer race applied thereto in the same manner as described above, and the bearing assembly completed as also described above.

Therefore, the term "pillow block" as used in the appended claims is intended to mean all rolling bearings that include a housing formed from the materials specified above regardless of the particular manner in which the housing is shaped for purposes of mounting the unit in operating position.

The term "rolling bearing" as used in this specification and in the appended claims is intended to include all forms of bearing units in which one or more members or elements are rolled between inner and outer race members. This term is thus meant to include units employing single and multiple rows of balls, rollers, and the like, and thus is synonymous with the term "antifriction bearing" widely used in the bearing art, and is to be distinguished from plain type bearings or bearing units.

The terms "bearing" and "bearing assembly" as used in this specification and in the appended claims are intended to mean the combination of the inner and outer race members and the rolling elements associated therewith, whether assembled or unassembled.

This application is closely related to my copending application Ser. No. 697,842, filed concurrently herewith, the disclosure of which is incorporated in its entirety by reference.

The term "ductile" as employed in the appended claims means all materials of the type mentioned in the specification as well as all suitable materials of the ductile or malleable type.

I claim:

1. The method of making pillow block rolling bearings which includes the steps of taking a pillow block blank formed from a ductile material and including a cylindrical bearing receiving portion formed therein, forming said bearing receiving portion with a concave, spherically contoured annular bearing seat, taking an outer race having an outer spherically contoured surface that is complementary to said bearing seat, forcing said outer race endwise into said seat while at the same time compressing it transversely within its elastic limit, rotating said outer race into the plane of said seat, eccentrically mounting an inner race within the outer race to form a crescent shaped space between the outer and inner races, filling said crescent shaped space with rolling bearings until a rolling bearing is positioned adjacent the inner and outer races at each end of the crescent shaped space, and no further rolling bearings can be pressed into said space, compressing the bearing seat and said outer race laterally thereof to give said outer race an elliptical configuration with its minor axis extending through the center of said crescent shaped space, and pressing a further rolling bearing into said space, whereby one of the bearings at the ends of said space is forced past the center line of said inner race, and releasing said bearing seat and said outer race, whereby said inner race is positioned concentrically within the outer race, with said rolling bearings positioned in a circle between said inner and outer races.

2. The method of making a ball bearing unit of the type in which a ball bearing, including an annular, one-piece, outer race and an inner race with a series of balls between the outer race and the inner race is mounted in a housing, with the periphery of the outer race being spherically contoured and coacting with a correspondingly shaped bearing seat in the housing, whereby the ball bearing is capable of self-alignment with respect to the housing, which method comprises: taking said annular one-piece outer race with its spherically contoured periphery and compressing it transversely of its central axis to deform said outer race, but within its elastic limit, to an elliptical shape, and while in this elliptical shape inserting it into said housing, then allowing said outer race to spring back to its normal annular shape within said bearing seat and rotating it into substantial planar relationship to said housing, and then completing the ball bearing assembly by inserting the inner race within the outer race and biasing it toward one side of the outer race to thereby form a crescent-shaped space between the inner race and the outer race, introducing said balls into said crescent-shaped space, then centering the inner race and distributing the balls around the periphery thereof, and finally applying retaining means to hold the balls in properly spaced relation around the periphery of the inner race.

3. The method as set forth in claim 2 in which, in order to facilitate the insertion of the outer race into said housing, the latter is also deformed, but within its elastic limit, to an elliptical shape, with the major axis of the latter elliptical shape being normal to the major axis of the elliptical shape of the outer race when it is being introduced into said housing.

4. The method as set forth in claim 2 in which said outer race is transversely compressed into elliptical shape by applying a force endwise on the outer race as it is being inserted into the housing and driving the race between tapered guide surfaces, the shortest distance between which is adjacent the housing and is substantially equal to or less than the smallest diameter of said bearing seat.

References Cited in the file of this patent

UNITED STATES PATENTS

| | | |
|---|---|---|
| 1,668,105 | Crow | May 1, 1928 |
| 1,906,259 | Gibbons | May 2, 1933 |
| 2,582,995 | Laurent | Jan. 22, 1952 |
| 2,633,627 | Olmstead | Apr. 7, 1953 |
| 2,794,691 | Noe | June 4, 1957 |